June 18, 1957 H. S. BOORMAN 2,796,037
APPARATUS FOR MAKING HEAT EXCHANGERS
Filed June 28, 1951 6 Sheets-Sheet 3
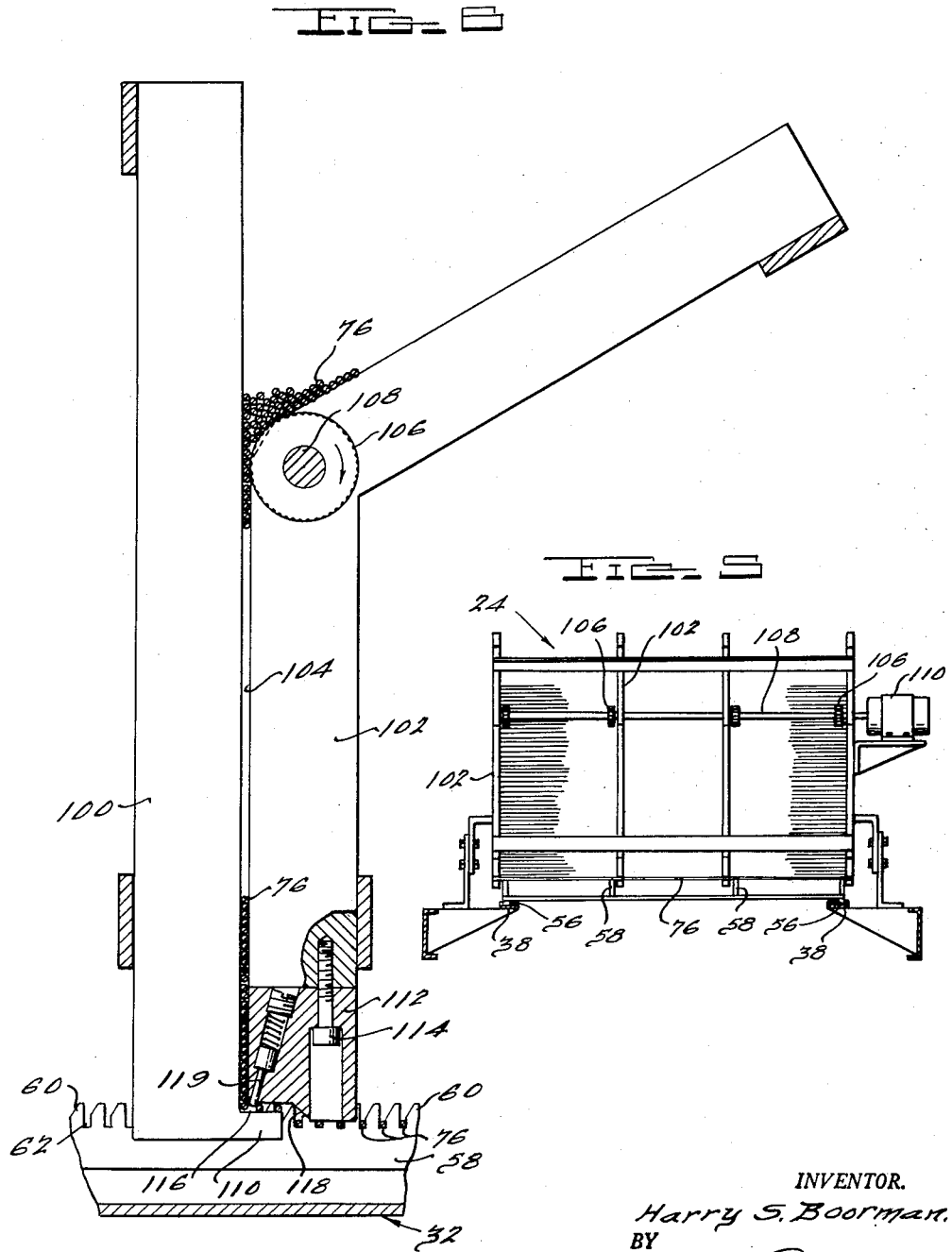
INVENTOR.
Harry S. Boorman.
BY
E. J. Balluff
ATTORNEY.

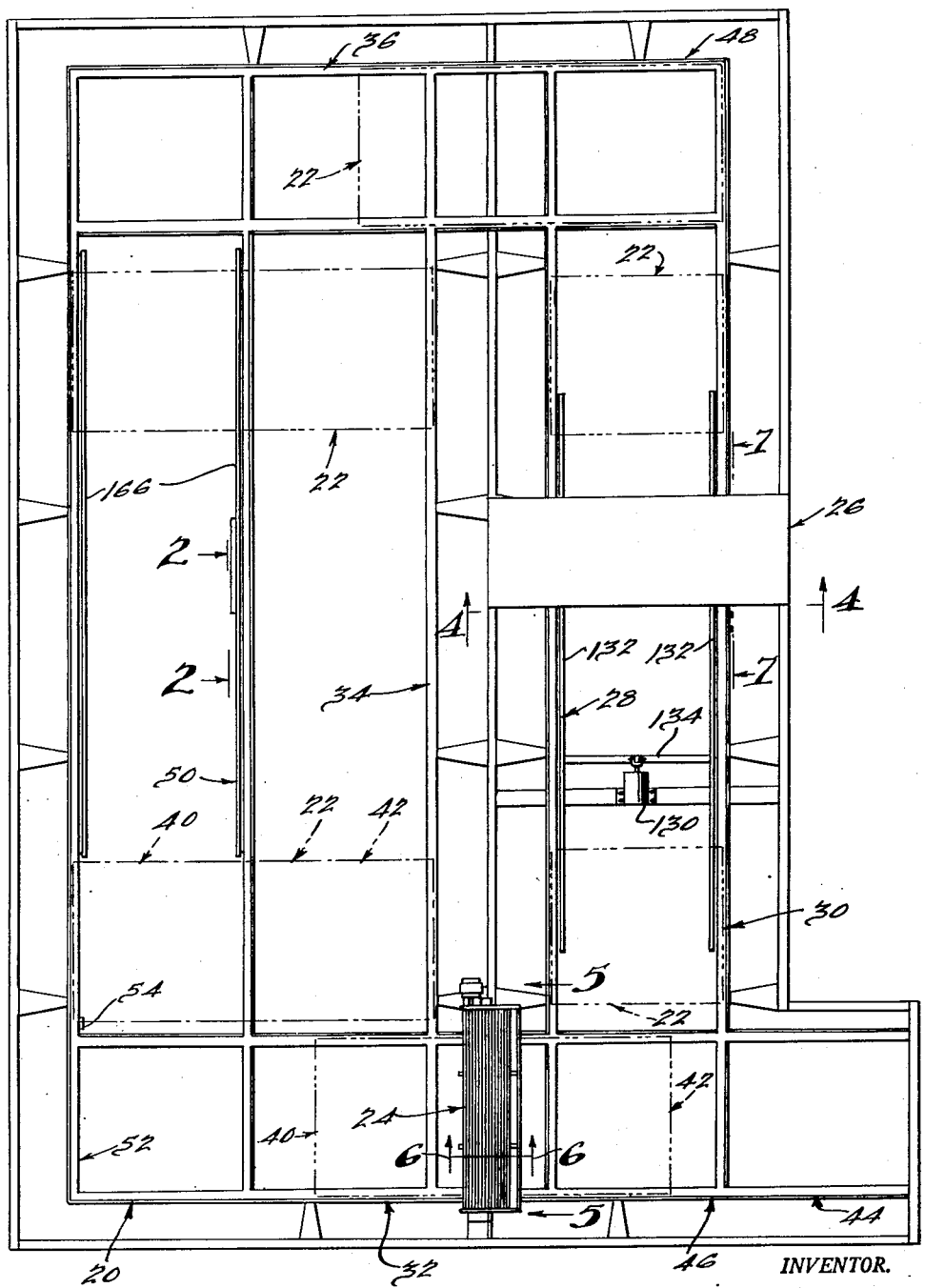

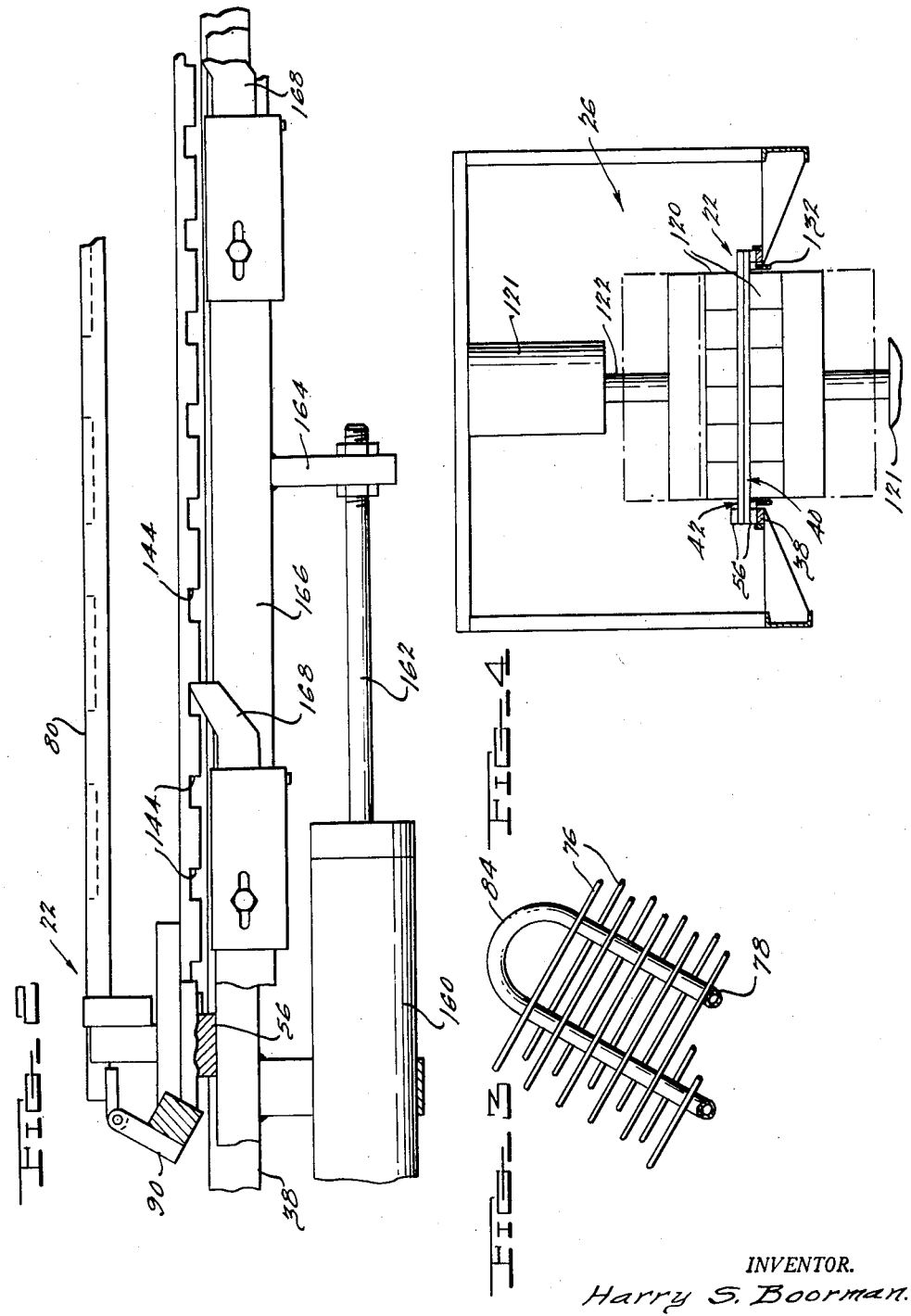

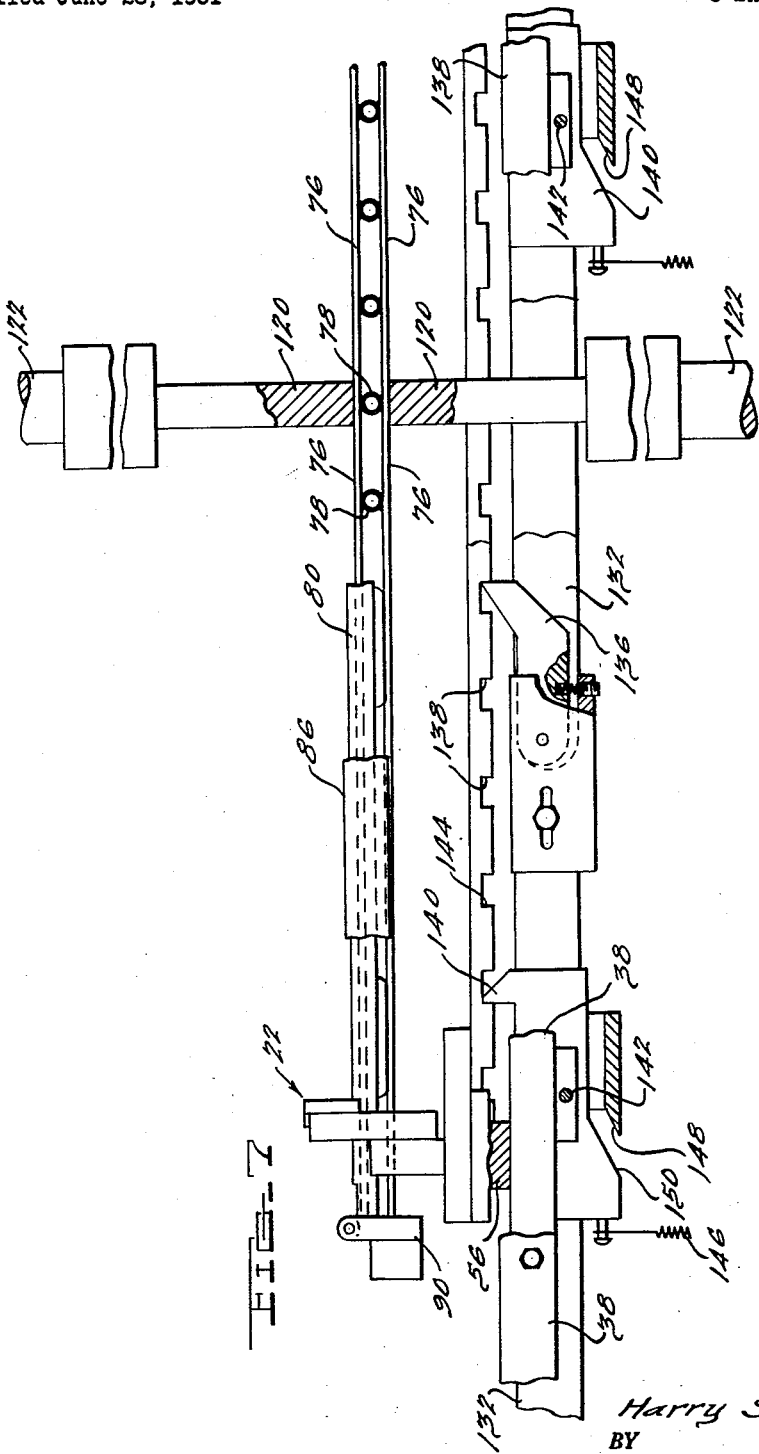

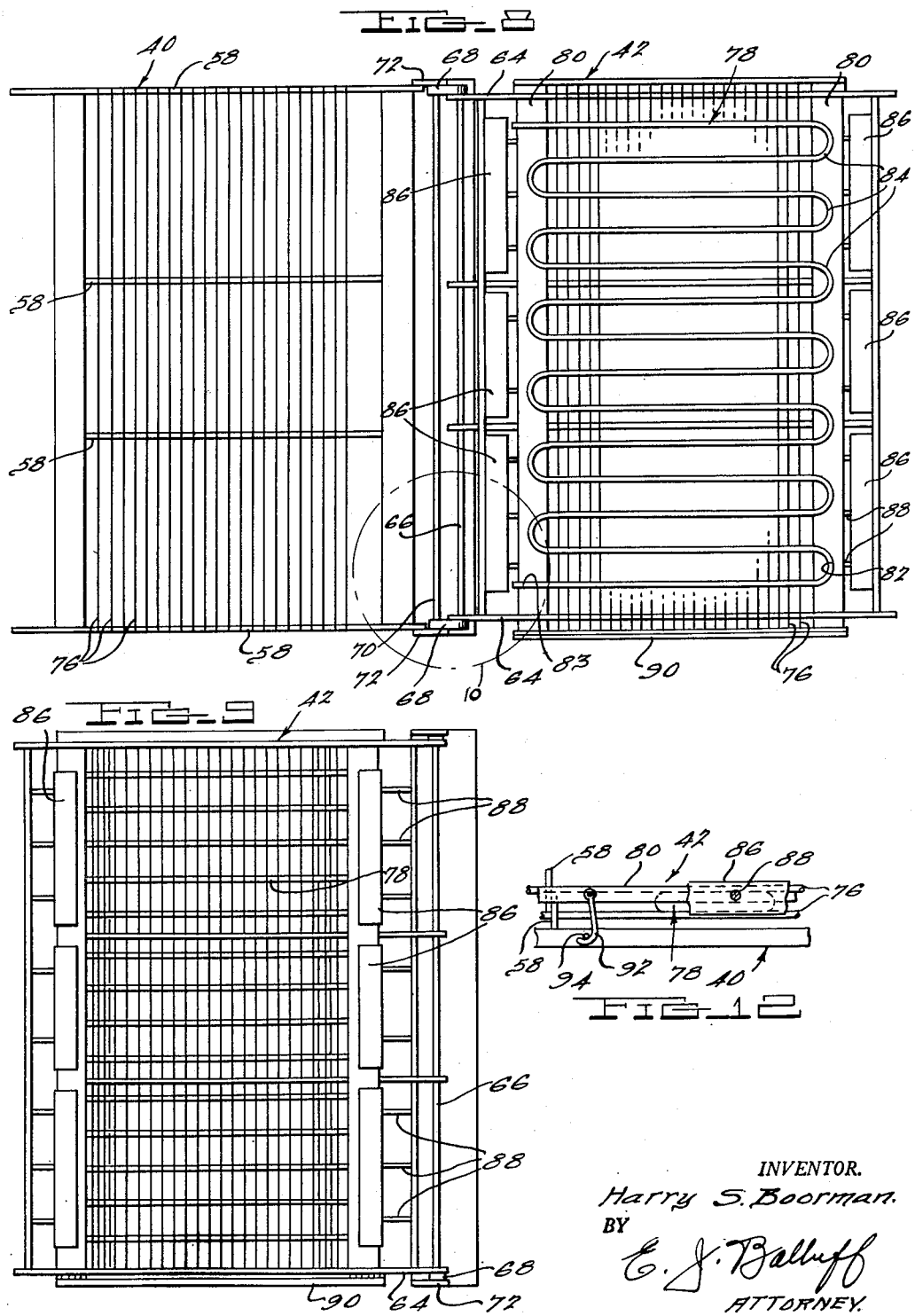

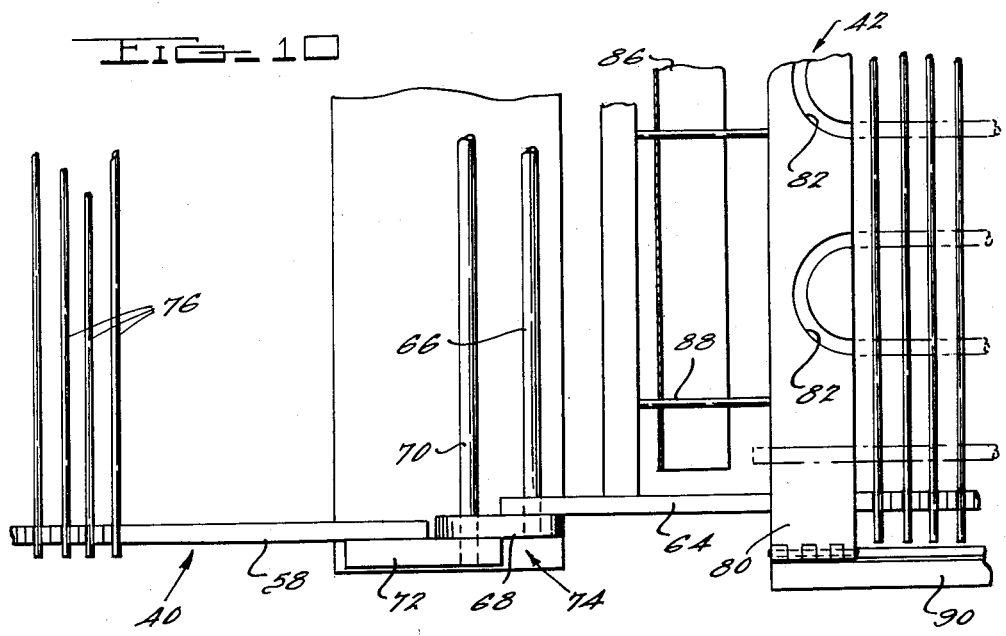
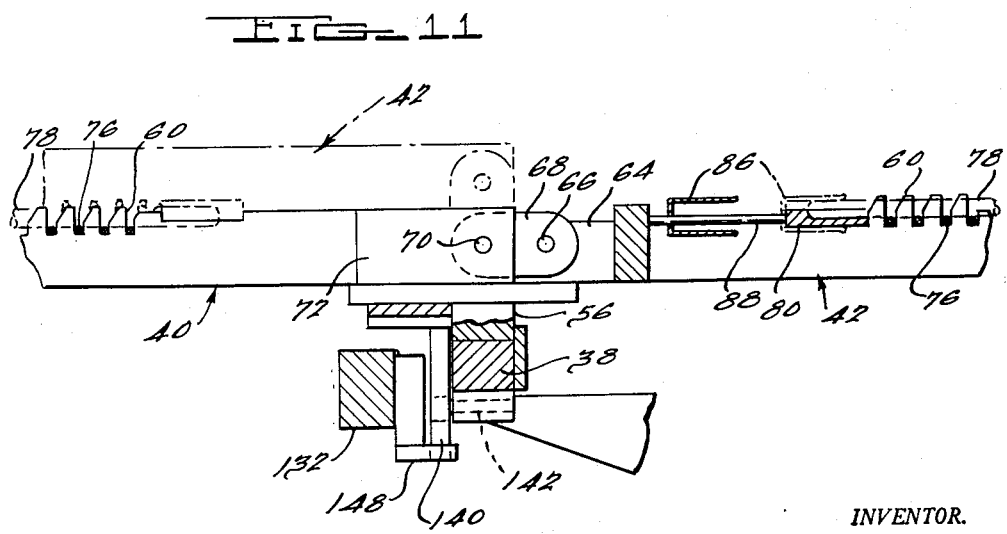

United States Patent Office 2,796,037
Patented June 18, 1957

2,796,037

APPARATUS FOR MAKING HEAT EXCHANGERS

Harry S. Boorman, Livonia, Mich., assignor to Wall Wire Products Company, Plymouth, Mich., a corporation of Michigan Application June 28, 1951, Serial No. 234,071

2 Claims. (Cl. 113—99)

This invention relates to an apparatus for making heat exchangers and has particular reference to an apparatus useful for assembling and securing rods which form the secondary surfaces to a formed length of tubing which constitutes the primary surface of a heat exchange device, such as a condenser.

The heat exchange device in question comprises a length of tubing bent into a serpentine form and having a series of rods integrally united to each side thereof, the rods forming the secondary surface of the condenser and, as illustrated, being spaced and arranged in parallel relation with respect to each other.

The invention contemplates an apparatus and method for arranging rod stock in the form of two grids and sandwiching a formed length of tubing between the two grids, and then integrally uniting the tubing with the rod stock forming the grids by a welding operation, the apparatus being so designed as to carry out the process in a continuous and efficient manner so that the condensers may be produced on a production basis at an economical cost.

A principal object of the invention is to provide efficient apparatus for making heat exchangers of the type herein disclosed.

Other and further objects of the invention will be apparent from the following description and claims and may be understood by reference to the accompanying drawings, of which there are six sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a plan view illustrating the apparatus, with certain parts thereof being shown schematically;

Fig. 2 is an enlarged fragmentary sectional view of the apparatus taken along the line 2—2 of Fig. 1, looking in the direction of the arrows, and showing the means for advancing the rod and tube assembling fixture along one portion of the track;

Fig. 3 is a fragmentary perspective view illustrating the construction of the condenser to which my invention pertains;

Fig. 4 is an enlarged vertical sectional view taken along the line 4—4 of Fig. 1 and schematically illustrating the welder for welding the rods and tubing together;

Fig. 5 is an enlarged vertical sectional view taken along the line 5—5 of Fig. 1 and illustrating the feed hopper;

Fig. 6 is an enlarged vertical sectional view taken along the line 6—6 of Fig. 1, through the feed hopper and showing the provisions for feeding rods to the rod and tube carrying rack;

Fig. 7 is an enlarged vertical sectional view taken along the line 7—7 of Fig. 1, illustrating the arrangement for feeding the rod and tube carrying fixture through the welder;

Fig. 8 is a plan view of the rod and tube carrying fixture in its open position and with two series of rods and a formed length of tubing positioned therein;

Fig. 9 is a plan view of the rod and tube carrying fixture in its closed position with the two series of rods and the formed length of tubing clamped therein with the tubing sandwiched between the two series of rods;

Fig. 10 is an enlarged fragmentary plan view of the portion of the rod and tube carrying fixture enclosed in the circle 10 of Fig. 8;

Fig. 11 is a side elevational view of Fig. 10 and showing in addition parts of the fixture in the closed position thereof in dotted lines; and Fig. 12 is a fragmentary sketch illustrating the means for locking the rod and tube holding fixture in its closed position.

Referring now to Fig. 1, the apparatus comprises in general a rectangular track indicated generally at 20, a series of hinged fixtures indicated generally at 22 movable around said track, a rod hopper indicated generally at 24 having provisions cooperable with said fixtures 22 for feeding rods thereto, a welder indicated generally at 26 operable for welding the rods and tubing together, and means 28 for advancing the rod and tubing fixture through the welder.

The track 20 includes a stretch indicated generally at 30 which extends through the welder, another stretch 32 which extends beneath the rod hopper 24, a return stretch 34 for returning the fixtures in an open position to the stretch 32, and a stretch 36 which connects the delivery end of the stretch 30 with the return stretch 34. The track is formed of lengths of spaced channel members 38, as shown in Fig. 5, so as to provide a guide and track for slidably supporting the fixtures 22.

The fixtures 22 comprise two racks 40 and 42 hingedly secured together (Figs. 8 and 9). In moving to the right along the stretch 32 of the track the fixture is open with the rack 42 preceding the rack 40, and in this manner the two racks are successively passed beneath the feed hopper 24 for receiving rods therefrom. The stretch 32 includes a spur 44 which projects beyond the intersection of the stretch 30 of the track with the stretch 32 for accommodating the rack 42 when the fixture is in its open position. At this intersection, indicated at 46, the rack 40 is aligned with the stretch 30 of the track so that when the fixture is closed by folding the rack 42 over on top of the rack 40 (Fig. 9), the fixture 22 is then in position to be moved along the stretch of track 30 through the welder.

Before the fixture is closed a formed length of tubing is positioned on the rods in the rack 42 and when the fixture is closed the tubing will be sandwiched and clamped between the series of rods carried by the racks 40 and 42, as will be described more fully hereinafter.

The means 28 is adapted to feed the fixtures 22 along the stretch 30 through the welder to the crossover stretch 36 which intersects the discharge end of the stretch 30 and the entering end of the stretch 34. From the intersection 48 of the stretch 30 of the track and the crossover stretch 36, the fixture 22 is moved to the left along the crossover stretch, and while on the crossover stretch 36 the fixture is opened so as to permit removal of the assembled heat exchanger. The crossover stretch 36 thus provides a station for unloading the assembled product from the fixture 22.

After removal of the assembled product from the open fixture 22 the same is then moved along the return stretch 34 to the loading stretch 32. The return stretch 34 of the track is of double width so as to support the racks 40 and 42 in their open position as shown, so that the racks 40 and 42 may be returned to the loading stretch 32 of the track in position to be fed below the rod hopper 24 for receiving rods therefrom.

The return stretch 34 of the track is provided with a means 50 for advancing the fixture 22 to a position just ahead of the intersection 52 between the return stretch 34 and the loading stretch 32 of the track, the rack 40 being adapted in such position to engage a control switch 54 for discontinuing the operation of the means 50. An operator moves the open fixture 22 from the stretch 34 of the track on to the loading stretch 32 and beneath the rod hopper 24 to the intersection 46 where an operator then places the formed length of tubing on the rods in the leading rack 42. The track 20 is suitably supported upon a frame, preferably at waist height, for the convenience of the operators who have to manipulate the fixtures 22 along the track 20.

As shown in Figs. 8, 9, 10 and 11, the rack 40 comprises a rectangular frame made up of suitable lengths of bar stock and provided with shoes 56 which slide on the channel members of the track, a shoe being provided on the under side of each corner of the rack 40. The cross pieces 58 of the frame of the rack 40 on their upper edges are formed as teeth 60 (Fig. 6) to form notches 62 for receiving and holding a series of rods in the form of a grid.

The rack 42 is similar in construction to the rack 40 and is similarly provided with the tooth and notch formation just described for receiving and holding a series of rods in the form of a grid. Arms 64 of the rack 42 are pivoted on a rod 66 which in turn is carried by a pair of links 68, the links in turn being pivoted on a rod 70 carried by fixed arms 72 on the rack 40. The links 68 and the rods 66 and 70 and the connection thereof with the racks 40 and 42 form a hinge indicated generally at 74 between the racks 40 and 42, permitting the fixture to be opened up as shown in Fig. 8 or to be closed as shown in Fig. 9.

In Fig. 8 the rack 40 is shown loaded with a series of rods 76 disposed in spaced and parallel relation in a plane in the form of a grid. The rack 42 also is loaded with a series of rods 76 in the form of a grid with the rods in spaced and parallel relation to each other. The rack 42 also has positioned thereon a formed length of tubing indicated generally at 78, the tubing being round tubing arranged in a serpentine form with the runs thereof extending crosswise of the rods 76.

Frame members 80 of the rack 42, which extend parallel to the rods 76, are each provided with a series of curved grooves 82 for receiving the return bends 84 and two straight grooves 83 for receiving the ends of the tubing 78, thereby to properly position and support the tubing within the rack 42. The rack 42 is further provided with a series of channel-shaped clamping members 86 which are adapted to be slid over and embrace the members 80 and the return bends 84 as shown in Fig. 11, so as to lock the tubing 78 in the rack 42. The clamping members 86 are slidable on rods 88 between a retracted position as shown in full lines in Fig. 11 and a clamping position as shown in dotted lines. After the tubing 78 is positioned in the rack as shown in Fig. 8, the clamping members 86 are moved to their clamping position, thereby clamping the tubing 78 to the rack and thereby utilizing the tubing 78 to clamp the rods 76 in the rack 42.

The rack 42, like the rack 40, is provided with a shoe 56 at each corner thereof for supporting the rack 42 on the track 20 when the fixture is in its open position. The rack 42 has a bar 90 pivoted to the rear edge thereof which, when positioned as illustrated in Fig. 7, forms a stop and abuts one end of the rods 76 so as to position the ends of all of the rods 76 in the same plane. When the frame is opened as shown in Figs. 8 and 10, the stop, by gravity, hangs downwardly, but when the rack 42 is inverted to the position as shown in Fig. 9 the stop 90 swings around to abut the ends of the rods 76 and align such ends in the same plane.

After the fixture is closed so as to sandwich the tubing 78 between the two series of rods 76 carried by the racks 40 and 42, the fixture is locked in a closed position so as to clamp the rods and the tubing together under pressure and in intimate metal-to-metal engagement. During the inverting of the rack 42 when it is swung from the position shown in Fig. 8 to that shown in Fig. 9, the clamping members 86 hold the tubing 78 in the rack 42 and the tubing 78 holds the rods 76 in position in the slots 62. After the fixture is closed, as shown in Fig. 9, latches 92 on the rack 42 engageable with pins 94 on the rack 40 (Fig. 12) lock the fixture in its closed position with the rods and tubing clamped together as just described.

The rod hopper 24, as shown in Figs. 5 and 6, consists of a series of upright bars 100 and 102 spaced apart just slightly more than the diameter of one of the rods 76, thereby to form a slot or chute 104 through which the rods 76 are fed from the hopper on to the racks, the upper ends of the bars 102 diverging from the bars 100 so as to accommodate a supply of rods 76.

Notched wheels 106 fixed to a shaft 108 for rotation therewith and driven by a motor 110 turn in a clockwise direction so as to prevent the rods from jamming at the entrance to the slot 104, the notched wheels serving to keep the rods in alignment so that they will be properly fed into the slot 104. The lower end of each of the rods 100 has a laterally extending arm 110 which projects below an extension 112 of the adjacent bar 102, the extension 112 being secured to the bar 102 by bolt 114. The arm 110 thus cooperates with the extension 112 to form a horizontally extending portion 116 of the slot 104, such portion forming the discharge end of the slot 104. This horizontally extending portion 116 lies below the path of the tops of the teeth 60 of the racks 40 and 42 as they pass below the feed hopper 24 so that each of the teeth 60 will engage a rod 76 at the bottom end of the slot 104 and will carry such rod through the horizontal portion 116 of the slot and past the end of the arm 110, whereupon the cam surface 118 on the part 112 will force the rod 76 into the bottom of a slot 62 in the event that it does not freely drop into the bottom of such slot.

The end of a spring pressed plunger 119 projects a short distance into the horizontal portion 116 of the slot so as to prevent the rod 76 from passing out of the slot 104 except in response to the action of the teeth 60. Thus, as the racks 42 and 40 are passed beneath the rod hopper 24, the rods 76 will be fed one at a time on to the racks 42 and 40 so as to load each of such racks with a series of rods.

As previously described, after the racks 42 and 40 are loaded, they are moved to the intersection 46 where the tubing 78 is assembled to the fixture and the fixture closed, and then moved along stretch 30 for passage through the welder.

As shown in Figs. 4 and 7, the welder consists of upper and lower electrodes 120 which are reciprocable by hydraulic piston and cylinder units 121, the shafts of which are indicated at 122. The electrodes 120 are shown in their closed position in Fig. 7 with the upper electrode 120 seated on the upper series of rods 76 and the lower electrode 120 seated against the lower series of rods 76, with a run of the tubing 78 positioned directly between the electrodes 120 so that when the welding current flows between the electrodes through the rods 76, tubing 78, and the rods 76, the rods 76 will be welded to the sides of the tubing 78. After the weld has been made the hydraulic cylinders separate the electrodes 120 from the rods 76, whereupon the means 28 previously referred to advances the fixture 22 another step so that the next run of the tubing 78 will be positioned directly between the electrodes for conducting current between the rods 76 when the electrodes are closed. While the welder shown will weld only one run of tubing 78 to the rods 76, obviously two or more electrodes could be used so as to weld as many joints as desirable at any one time. Thus, with the apparatus as illustrated, fourteen welds will be needed to integrally unite the fourteen parallel runs of the tubing to the rods 76.

The fixture 22 is relatively open, as shown in Fig. 9, so as not to interfere with the closing of the electrodes, it being observed that the racks 58 are offset from the parallel runs of the tubing 78. The electrodes need separate only sufficiently to pass the fixture therebetween.

The reciprocation of the electrodes is synchronized with the operation of the step by step advancing means 28 so that during the dwells or stops of the advancing means the electrodes 120 are closed and energized, and when the electrodes are separated the advancing means are operable to advance the fixture 22 for a succeeding operation. Any suitable conventional control may be employed for this purpose, and to this end I have employed electronic controls which are commercially available for this purpose. These controls control the operation of the hydraulic cylinders 121 which reciprocate the electrodes and the air cylinder 130 which reciprocates and forms a part of the advancing means 28.

The advancing means 28, as illustrated in Fig. 1, comprises two sliding bars 132 joined by a bar 134 to which the piston rod of the air cylinder 130 is connected, the cylinder 130 being mounted upon a stationary part of the frame which supports the track 20. The bars 132 are reciprocably mounted adjacent the channels formed in the stretch of track 30 and include a spring biased, pivoted dog 136 which is cooperable with shoulders 138 formed by notches in the frame of the fixture 22 so that when the bars 132 move to the right (Fig. 7) the fixture 22 will move therewith, the stroke of the piston of the air cylinder 130 being such that the bars 132 and the fixture 22 will move a sufficient distance to position succeeding runs of tubing 78 in proper welding relation with respect to the electrodes 120.

A latch 140 pivoted at 142 is biased into one of the notches for engagement with the shoulder 144 thereof so as to positively determine the extent of movement of the fixture 22 upon each actuation of the air cylinder 130. A spring 146 biases the latch 140 into the position as shown in Fig. 7, that is, its locking position. Thus, during each welding operation the fixture 22 is positively held against movement in both directions by the latch 140 and the dog 136.

Upon retraction of the piston of the air cylinder 130 the bars 132 and the dogs 136 carried thereby will be retracted (moved to the left, Fig. 7) so that the dogs 136 can engage the shoulder 138 of the next adjacent notch to the left (Fig. 7). A cam 148 carried by and depending from the slide bars 132 engages a cam 150 on the latch 140 for disengaging the same from the shoulder 144 so as to permit the movement of the fixture in the next step to the right during the power stroke of the air cylinder. As the slide bars 132 move to the right, the cam 148 will disengage from the cam 150 and permit the latch 140 to engage a shoulder 144 to position and lock the fixture 22 against movement.

Since it is contemplated that a series of loaded fixtures will be passed through the welder, one immediately following the other, another latch 140 is positioned to the right of the welder, and it will be appreciated that the step by step advancing means 28 will move not only the fixture 22 with which the dog 136 is in engagement, but also all fixtures ahead of it. The operator stationed at intersection 46 can, by pushing one fixture against the other on the stretch 30, push the leading fixture 22 to a position where it will be subject to the action of the step by step advancing means 28.

After passing through the welder the fixture 22 is pushed on to the crossover stretch 36 where the fixture is opened and the welded heat exchanger is removed therefrom. Thereafter, the operator moves the open fixture 22 on to the return stretch 34 to a position where it can be acted upon by the means 50, which is substantially the same in construction and operation as the means 28. The advancing means 50 is illustrated in more detail in Fig. 2, from which it may be seen that it includes an air cylinder 160, the piston rod 162 of which is connected to a bar 164 that is connected to the slide bars 166. Each of the slide bars is provided with a spring biased dog 168, like the dog 136, which is engageable upon reciprocation of the slide bars 166 with the shoulders 144 on the fixture 22 for advancing the same along the return stretch to the loading stretch 32.

As previously indicated, a control 54 positioned just ahead of the intersection 52 and engaged by a part of the fixture 22 is adapted to deenergize the air cylinder 160 so as to prevent further operation thereof until the operator pulls the open fixture 22 on to the loading stretch 32.

The rods 76 are made from rod stock of cold rolled steel, and the tubing may be the round multi-ply tubing now commonly used for condensers.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. Apparatus for assembling a heat exchanger formed of rod stock and a formed length of tubing which comprises a pair of racks hinged together, each of said racks being provided with a series of slots for holding rod stock in the form of a grid, one of said racks having provisions for locating a formed length of tubing above and in direct contact with the grid carried thereby, means for clamping said tubing to said one rack thereby to clamp said one grid to said one rack in order to permit the same to be inverted relative to the other rack so as to sandwich said tubing between said grids, said racks being of skeletal construction to expose from opposite sides thereof the points at which said rod stock and tubing cross when said tubing is sandwiched between said grids.

2. Apparatus for assembling a heat exchanger formed of rod stock and a length of tubing in serpentine form which comprises a pair of racks hinged together, each of said racks being provided with a series of rod holding slots for holding a grid of rods, one of said racks having curved slots for receiving the return bends of said tubing so as to locate said tubing above and in direct contact with the grid of rods arranged therein, means for clamping the return bends of said tubing to said one rack thereby to clamp the grid of rods in position in said one rack in order to permit said one rack to be inverted so as to position it above said other rack thereby to sandwich said tubing between said grids, said racks being of skeletal construction to expose from opposite sides thereof the points at which said rod stock and tubing cross when said tubing is sandwiched between said grids.

References Cited in the file of this patent

UNITED STATES PATENTS

| | | |
|---|---|---|
| 929,045 | Stewart | July 27, 1909 |
| 1,005,267 | Metzger | Oct. 10, 1911 |
| 1,077,058 | Feldkamp | Oct. 28, 1913 |
| 1,485,099 | Wahl | Feb. 26, 1924 |
| 1,641,078 | Furst | Aug. 30, 1927 |
| 1,642,894 | Rober | Sept. 20, 1927 |
| 1,709,128 | Gurian | Apr. 16, 1929 |
| 1,801,805 | Dobrick | Apr. 21, 1931 |
| 1,842,121 | Riley | Jan. 19, 1932 |
| 1,955,837 | Scholl | Apr. 24, 1934 |
| 1,975,422 | Hellenbroich | Oct. 2, 1934 |
| 2,158,229 | Goldthwaite | May 16, 1939 |
| 2,176,604 | Benkelman | Oct. 17, 1939 |
| 2,301,636 | Nicol | Nov. 10, 1942 |
| 2,417,144 | Trimble | Mar. 11, 1947 |
| 2,505,619 | Holm | Apr. 25, 1950 |
| 2,614,517 | Peterson | Oct. 21, 1952 |
| 2,634,697 | Nofzinger | Apr. 14, 1953 |

FOREIGN PATENTS

| | | |
|---|---|---|
| 452,231 | Great Britain | Aug. 19, 1936 |